(12) United States Patent
Hattori et al.

(10) Patent No.: US 10,717,157 B2
(45) Date of Patent: Jul. 21, 2020

(54) SOLDER MATERIAL, SOLDER PASTE, SOLDER PREFORM, SOLDER JOINT AND METHOD OF MANAGING THE SOLDER MATERIAL

(71) Applicant: Senju Metal Industry Co., Ltd., Tokyo (JP)

(72) Inventors: Takahiro Hattori, Tochigi (JP);
Hiroyoshi Kawasaki, Tokyo (JP);
Hiroshi Okada, Shanghai (CN);
Takahiro Roppongi, Tochigi (JP);
Daisuke Soma, Tochigi (JP); Isamu Sato, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 467 days.

(21) Appl. No.: 15/523,714

(22) PCT Filed: Nov. 5, 2014

(86) PCT No.: PCT/JP2014/079347
§ 371 (c)(1),
(2) Date: May 2, 2017

(87) PCT Pub. No.: WO2016/071971
PCT Pub. Date: May 12, 2016

(65) Prior Publication Data
US 2017/0312860 A1   Nov. 2, 2017

(51) Int. Cl.
*B23K 35/00* (2006.01)
*B23K 35/26* (2006.01)
(Continued)

(52) U.S. Cl.
CPC ............ *B23K 35/262* (2013.01); *B22F 1/025* (2013.01); *B22F 9/08* (2013.01); *B23K 35/025* (2013.01);
(Continued)

(58) Field of Classification Search
CPC .... H01L 2224/45147; H01L 2924/014; B23K 35/0244; B23K 35/302; B23K 35/025;
(Continued)

(56) References Cited

U.S. PATENT DOCUMENTS 6,333,554 B1   12/2001   Kitajima et al.
2004/0050903 A1   3/2004   Satou et al.
(Continued)

FOREIGN PATENT DOCUMENTS

CN   101854775 A   10/2010
JP   2005334955 A   12/2005
(Continued)

OTHER PUBLICATIONS

Computer english translation JP-2010099694-A (Year: 2014).*

*Primary Examiner* — Erin B Saad
(74) *Attorney, Agent, or Firm* — The Webb Law Firm (57) ABSTRACT

Provided is a solder material having oxidation resistance at the time of melting solder or after melting it, as well as managing a thickness of oxide film at a fixed value or less before melting the solder. A Cu core ball 1A is provided with a Cu ball 2A for keeping a space between a semiconductor package and a printed circuit board and a solder layer 3A that covers the Cu ball 2A. The solder layer 3A is composed of Sn or a solder alloy whose main component is Sn. For the Cu core ball 1A, lightness is equal to or more than 65 in the L*a*b* color space and yellowness is equal to or less than 7.0 in the L*a*b* color space, and more preferably, the
(Continued)

lightness is equal to or more than 70 and the yellowness thereof is equal to or less than 5.1.

12 Claims, 6 Drawing Sheets (51) Int. Cl.
| | |
|---|---|
| C22C 13/00 | (2006.01) |
| B23K 35/02 | (2006.01) |
| B23K 35/30 | (2006.01) |
| C25D 17/16 | (2006.01) |
| C25D 7/06 | (2006.01) |
| C25D 5/12 | (2006.01) |
| B22F 1/02 | (2006.01) |
| B22F 9/08 | (2006.01) |
| C25D 7/00 | (2006.01) |
| C22F 1/08 | (2006.01) |
| C25D 3/60 | (2006.01) |

(52) U.S. Cl.
CPC ...... *B23K 35/0222* (2013.01); *B23K 35/0233* (2013.01); *B23K 35/302* (2013.01); *C22C 13/00* (2013.01); *C25D 5/12* (2013.01); *C25D 7/00* (2013.01); *C25D 7/06* (2013.01); *C25D 17/16* (2013.01); *B22F 2301/10* (2013.01); *B22F 2301/30* (2013.01); *C22F 1/08* (2013.01); *C25D 3/60* (2013.01)

(58) Field of Classification Search
CPC ........ B23K 35/00; B23K 35/22; B23K 35/26; B23K 35/262; B23K 35/3006; B23K 35/3033; B23K 35/3046; B23K 35/365
See application file for complete search history.

(56) References Cited

U.S. PATENT DOCUMENTS

| | | |
|---|---|---|
| 2008/0012131 A1 | 1/2008 | Tanaka |
| 2011/0220196 A1* | 9/2011 | Nishi ................. C23C 2/02 136/256 |
| 2013/0333929 A1 | 12/2013 | Ogawa et al. |
| 2014/0010705 A1* | 1/2014 | Kanou ................. C22C 9/00 420/491 |
| 2015/0209912 A1 | 7/2015 | Kawasaki et al. |
| 2015/0313025 A1 | 10/2015 | Kawasaki et al. |
| 2015/0336216 A1 | 11/2015 | Hattori et al. |
| 2017/0246711 A1 | 8/2017 | Kawasaki et al. |

FOREIGN PATENT DOCUMENTS

| | | | |
|---|---|---|---|
| JP | 200934692 A | | 2/2009 |
| JP | 2009248156 A | | 10/2009 |
| JP | 2010099694 A | * | 5/2010 |
| JP | 201129395 A | | 2/2011 |
| JP | 5447745 B1 | | 3/2014 |
| JP | 5585751 B1 | | 9/2014 |
| JP | 5590259 B1 | | 9/2014 |
| TW | 201241194 A | | 10/2012 |
| WO | 0064625 A1 | | 11/2000 |
| WO | 2009090776 A1 | | 7/2009 |
| WO | 2012118202 A1 | | 9/2012 |
| WO | 2014087514 A1 | | 6/2014 |
| WO | 2014109052 A1 | | 7/2014 |

* cited by examiner

SOLDER MATERIAL, SOLDER PASTE, SOLDER PREFORM, SOLDER JOINT AND METHOD OF MANAGING THE SOLDER MATERIAL

CROSS-REFERENCE TO RELATED APPLICATION

This application is the United States national phase of International Application No. PCT/JP2014/079347 filed Nov. 5, 2014, the disclosure of which is hereby incorporated in its entirety by reference.

TECHNICAL FIELD

The present invention relates to a solder material, solder paste, solder preform, a solder joint and a method of managing the solder material.

BACKGROUND

Recently, along development of compact information equipment, electronic components to be mounted have been downsized rapidly. A ball grid alley (hereinafter referred to as "BGA") having electrodes at its rear surface is applied to such electronic components in order to cope with a narrowed connection terminal and a reduced mounting area because of the downsizing requirement.

As the electronic components to which the BGA is applied, for example, a semiconductor package is exemplified. The semiconductor package is composed with semiconductor chips having electrodes sealed with resin. Solder bump is formed on each of the electrodes of the semiconductor chips. The solder bump is formed by joining a solder ball to an electrode of the semiconductor chip. The semiconductor package to which the BGA is applied is mounted on a printed circuit board by joining the solder bump melted by heating and a conductive land of the printed circuit board. In recent years, a three-dimensional high-density mounting has been developed by stacking up the semiconductor packages in a height direction in order to meet the further high-density mounting requirement.

However, in a case that the BGA is applied to the semiconductor package for the three-dimensional high-density mounting, the solder ball may be crushed by semiconductor package's weight. If such an accident happens, it is conceivable that solder comes out from the electrodes, the electrodes connect to each other, and then a shorted connection occurs.

Accordingly, a solder bump has been considered, where a Cu core ball is electrically joined on an electrode of an electronic component by using solder paste. The Cu core ball comprises a Cu ball which becomes a core of the ball and a solder layer coating the surface of the Cu ball. The solder bump formed by using the Cu core ball can support a semiconductor package by the Cu ball, which is not melted at a melting temperature of the solder, even if the solder bump receives the weight of the semiconductor package when the electronic components are mounted on the printed circuit board. Therefore, it can be prevented that the solder bump is crushed by the semiconductor package's weight.

By the way, in a case where a reflow treatment is conducted on a Cu core ball placed on the electrode of a semiconductor chip, there is an occasion when an oxide film is formed on a solder surface of the Cu core ball due to heating at the time of the reflow treatment. By this influence of the oxide film, wettability defects and the like occur between the solder and an electrode pad. As the result, a mounting failure of the Cu core ball occurs, and therefore a problem that the productivity or yield ratio of the semiconductor package is significantly decreased arises. Accordingly, oxidation resistance is required at the time of melting the Cu core ball and after melting it.

In addition, there is also an occasion when a problem of oxide film of the Cu core ball arises due to the temperature or humidity of the storage environment of the Cu core ball after being manufactured. Even in a case where a reflow treatment is conducted after mounting a Cu core ball having an oxide film formed on the electrodes of the semiconductor package, wettability defects of solder occurs similarly, and the solder constituting the Cu core ball does not wetly spread across the entire electrode. Accordingly, there is a problem that a mounting failure of the Cu core ball occurs because of the electrode exposure, misaligned Cu core ball toward the electrodes or the like. Therefore, the management of oxide film thickness after manufacturing Cu core balls is also an important problem.

For example, Patent Document 1 discloses a technology such that Sn oxide film thickness formed on the surface of a solder ball is controlled at a fixed value or less, by setting yellowness (b* value) of the surface at 10 or less, in the solder ball which is composed of Ag of 0 through 4.0 mass %, Cu of 0 through 1.0 mass %, Sn as a balance and inevitable impurities. Patent Document 2 discloses a technology such that oxidation of Sn is inhibited by forming an oxide film of Ge preferentially on the surface of molten solder, by including Ge of 0.2% or less in a solder alloy.

PRIOR ART DOCUMENTS

Patent Documents

Patent Document 1: Japanese Patent Application Publication No. 2009-248156
Patent Document 2: Japanese Patent Application Publication No. 2005-334955

SUMMARY OF THE INVENTION

Problems to be Solved by the Invention

Figure 6:
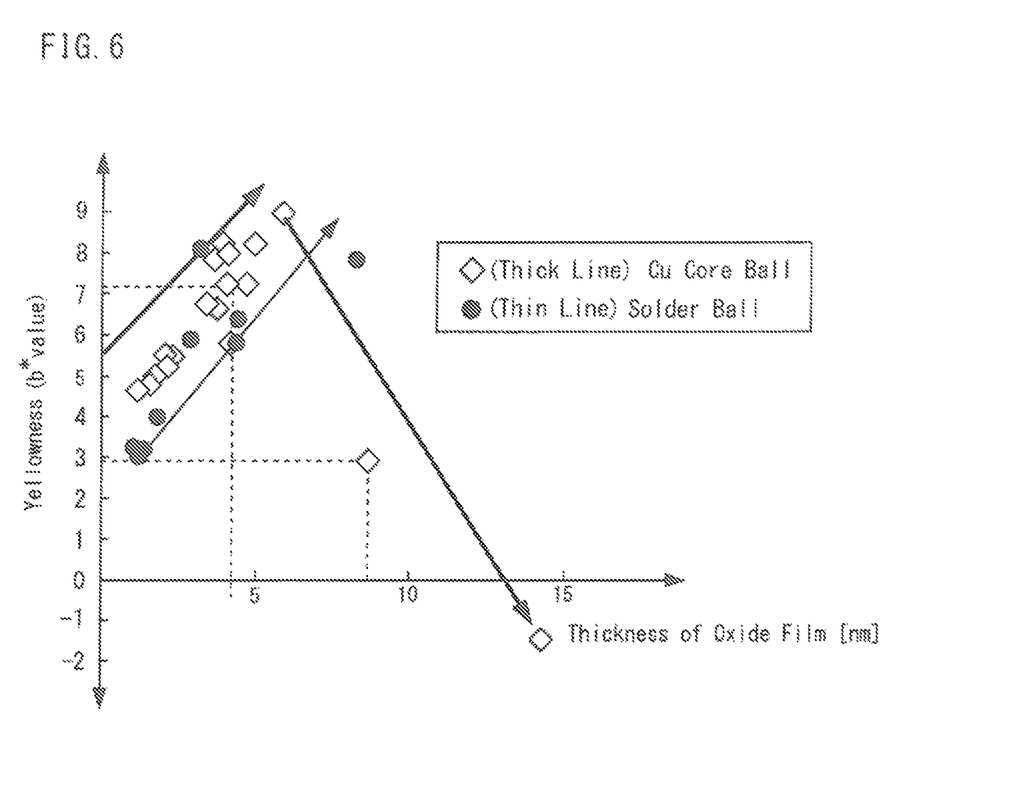
FIG. 6 is a graph showing a relationship between the thickness of the oxide film and yellowness for the Cu core balls and solder balls.

However, as disclosed in the above-mentioned Patent Document 1, in a case of an attempt to manage the oxide film thickness of a Cu core ball by the yellowness only, there is a problem as following. FIG. 6 is a diagram showing a relationship between the yellowness (b* value) and the oxide film thickness in each of Cu core ball and solder ball. A vertical axis indicates the yellowness and a horizontal axis indicates the oxide film thickness. As shown in FIG. 6, as for the solder ball, the thicker the oxide film thickness on the surface is, the more the yellowness rises. The relationship between the oxide film thickness and the yellowness is substantially proportional. Therefore, the oxide film thickness can be managed by the yellowness up to a certain thickness, in case of a solder ball.

Whereas, as for the Cu core ball, oxidation proceeds more rapidly than that for the solder ball and thereby the yellowness is increased. Afterwards, however, the yellowness is decreased regardless of the increase of the oxide film thickness. The relationship between the oxide film thickness and the yellowness is not proportional. For example, the oxide film thickness is 4 nm when the yellowness is 7.2, and the oxide film thickness is 8.7 nm when the yellowness is 2.9. Therefore, any correlation is not established between the oxide film thickness and the yellowness. It is conceivable that the impurities in solder plating coating the surface of the Cu ball account for this.

In this way, for the Cu core ball, there is a problem that the oxide film thickness cannot be managed accurately by the yellowness only like the solder ball. Therefore, there is a problem that a mounting failure or the like cannot be solved even if a Cu core ball is provided with oxidation resistance at the time of the reflow treatment. Moreover, Patent Document 2 discloses a technology relating to a solder alloy but does not disclose any management of oxide film thickness of a Cu core ball.

Accordingly, in the light of the above problems, the present invention has an object to manage an oxide film thickness at a fixed value or less before melting solder. Also, the present invention has an object to provide a solder material having oxidation resistance at the time of melting the solder or after melting it.

Means for Solving the Problems

The inventors of the present invention have noted both indexes of the yellowness and lightness (L* value) as an index which previously manages a thickness of the oxide film before melting a solder material, and have found that the thickness of the oxide film formed on the surface of the solder material can be managed accurately, by selecting the solder material of the yellowness and lightness within a set range. In addition, the inventors of the present invention have found that oxidation resistance can be improved at the time of melting a solder material and after melting it, by adding Ge into a covering layer so that the solder material holds potential oxidation resistance.

The present invention will be described as follows.

(1) A solder material containing a core for keeping a space between a joining object and an object to be joined, and a covering layer that covers the core, is characterized in that the covering layer is composed of Sn or a solder alloy having a main component of Sn and lightness of the solder material is equal to or more than 65 in the L*a*b* color space and yellowness thereof is equal to or less than 7.0 in the L*a*b* color space. The covering layer according to the present invention, for example, includes a layer covering a surface of the core directly, and a layer covering the core via other functioning layer(s) formed on the surface of the core. The functioning layers may is composed of a single layer or plural layers.

(2) The solder material according to the above-mentioned item (1) is characterized in that a thickness of an oxide film formed on a surface of the covering layer is equal to or less than 3.8 nm.

(3) The solder material according to the above-mentioned item (1) or (2) is characterized in that the lightness of the solder material is equal to or more than 70 and the yellowness thereof is equal to or less than 5.1.

(4) A solder material containing a core for keeping a space between a joining object and an object to be joined, and a covering layer that covers the core, is characterized in that the covering layer comprises Sn of 40% or more and Ge of 20 ppm or more and 220 ppm or less.

(5) The solder material according to the above-mentioned item (4) is characterized in that lightness of the solder material is equal to or more than 65 in the L*a*b* color space and the yellowness thereof is equal to or less than 7.0 in the L*a*b* color space.

(6) The solder material according to any one of the above-mentioned items (1) through (5) is characterized in that the core is covered with a layer which contains at least one element selected from a group of Ni and Co, and is covered with the solder layer.

(7) The solder material according to any one of the above-mentioned items (1) through (6) is characterized in that the core is composed of a single metal of Cu, Ni, Ag, Bi, Pb, Al, Sn, Fe, Zn, In, Ge, Sb, Co, Mn, Au, Si, Pt, Cr, La, Mo, Nb, Pd, Ti, Zr or Mg, an alloy thereof, a metal oxide thereof, a mixed metal oxide thereof, or a resin material in a spherical shape.

(8) The solder material according to any one of the above-mentioned items (1) through (6) is characterized in that the core is composed of a single metal of Cu, Ni, Ag, Bi, Pb, Al, Sn, Fe, Zn, In, Ge, Sb, Co, Mn, Au, Si, Pt, Cr, La, Mo, Nb, Pd, Ti, Zr or Mg, an alloy thereof, a metal oxide thereof, a mixed metal oxide thereof, or a resin material in a cylindrical shape.

(9) Solder paste is characterized in that the solder material according to any one of the above-mentioned items (1) through (8) is used.

(10) Solder preform is characterized in that the solder material according to any one of the above-mentioned items (1) through (8) is used.

(11) A solder joint is characterized in that the solder material according to any one of the above-mentioned items (1) through (8) is used.

(12) A solder material is characterized in that alpha dose of at least one selected from a group of the core, the covering layer, and a whole solder material in the solder material according to any one of the above-mentioned items (1) through (8) is equal to 0.0200 cph/cm2 or less.

(13) A method of managing a solder material which includes a core for keeping a space between a joining object and an object to be joined and a covering layer that covers the core, wherein the covering layer is composed of Sn or a solder alloy having a main component of Sn, is characterized in that the method includes measuring lightness and yellowness of the solder material in the L*a*b* color space, and selecting only a solder material showing the lightness of 65 or more and the yellowness of 7.0 or less based on the measurement result of the lightness and the yellowness of the solder material.

Effects of the Invention

According to the invention claimed in claim 1, since the lightness of the solder material is equal to or more than 65 in the L*a*b* color space and yellowness thereof is equal to or less than 7.0 in the L*a*b* color space, a solder material wherein the thickness of the oxide film is thin can be provided. Moreover, according to the invention claimed in claim 4, since the covering layer contains Ge of 20 ppm or more and 220 ppm or less, oxidation resistance can be improved at the time of melting solder and after melting it.

EMBODIMENTS FOR CARRYING OUT THE INVENTION

The following will describe preferable embodiments according to this disclosure in detail. It should be noted that all of the lightness and yellowness indicate the L*a*b* color space in the following description.

[1A. Cu Core Ball (No Ge Added)]

Figure 1:
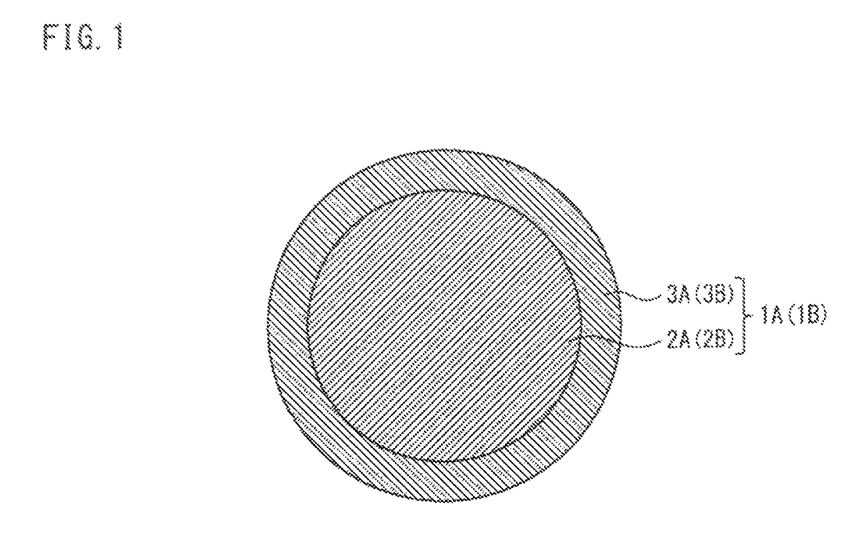
FIG. 1 is a cross-sectional view of a Cu core ball according to an embodiment of the present invention for showing a configuration example thereof.

FIG. 1 is a cross-sectional view of a Cu core ball 1A according to the present invention for showing a configuration example thereof. As shown in FIG. 1, the Cu core ball 1A according to the present invention contains a Cu ball (core) 2A having a predetermined size, for keeping a space between a semiconductor package (joining object) and a printed circuit board (object to be jointed), and a solder layer (covering layer) 3A which coats the Cu ball 2A. The lightness of the Cu core ball 1A is equal to or more than 65 and yellowness thereof is equal to or less than 7.0. The solder layer 3A is composed of Sn or a solder alloy whose main component is Sn.

<Cu Core Ball (Solder Layer): Lightness is 65 or More and Yellowness is 7.0 or Less>

For a Cu core ball 1A, its lightness is equal to or more than 65 and yellowness thereof is equal to or less than 7.0. More preferably, its lightness is equal to or more than 70 and yellowness thereof is equal to or less than 5.1. A thickness of an oxide film formed on a surface of the solder layer 3A can be managed so as to be a fixed value or less, by selecting the Cu core ball 1A within the above-mentioned range as lightness and yellowness. For example, when the lightness and yellowness of the Cu core ball 1A are measured and then a Cu core ball 1A having the lightness of 65 or more and the yellowness of 7.0 or less is selected, the thickness of the oxide film can be managed with 4 nm or less. In addition, when the lightness and yellowness of the Cu core ball 1A are measured and then a Cu core ball 1A having the lightness of 70 or more and the yellowness of 5.1 or less is selected, the thickness of the oxide film can be managed with 2 nm or less.

In this invention, the thickness of the oxide film on the Cu core ball 1A is managed by both indexes of the yellowness and lightness, because the thickness of the oxide film on the Cu core ball 1A cannot be managed accurately by only one index of either yellowness or lightness. The reason why the thickness of the oxide film on the Cu core ball 1A cannot be managed by yellowness only has been already explained, and therefore the following will describe a reason why the thickness of the oxide film on the Cu core ball 1A cannot be managed by lightness only.

Figure 2:
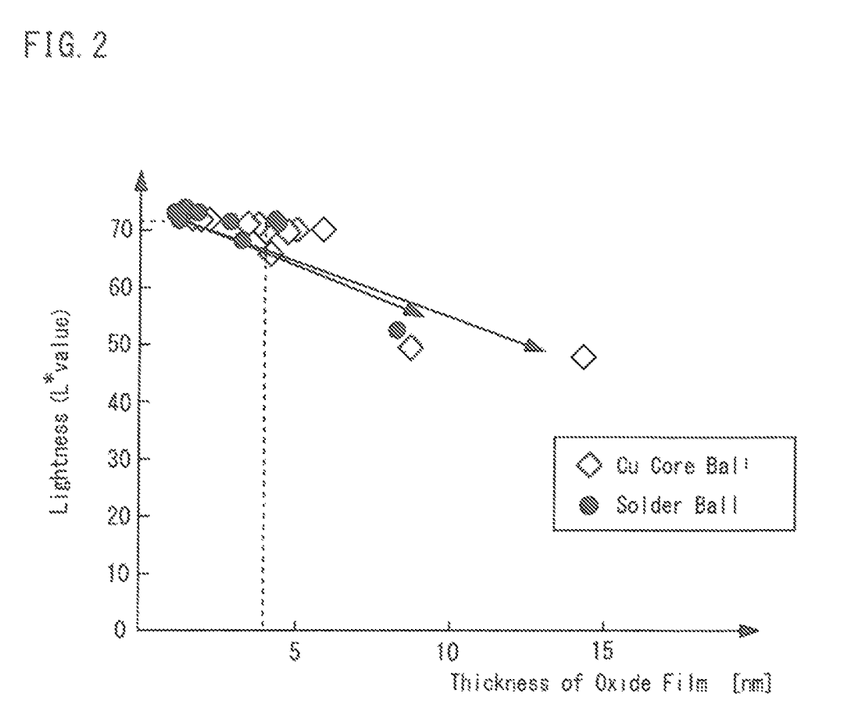
FIG. 2 is a graph showing a relationship between a thickness of an oxide film and lightness for the Cu core balls and solder balls.

FIG. 2 is a graph showing a relationship between the thickness of the oxide film and lightness for the Cu core balls 1A and solder balls. The vertical axis indicates the lightness and the horizontal axis indicates the thickness of oxide film. As shown in the FIG. 2, the thickness of oxide film and the lightness of the Cu core ball 1A are correlated, where the thicker the thickness of oxide film is, the lower the lightness is. A correlation coefficient R of the thickness of oxide film and the lightness in this moment has been obtained. The correlation coefficient R is obtained from the range of −1 to 1. Subsequently, a coefficient of determination $R^2$ has been obtained by squaring the calculated correlation coefficient. The coefficient of determination $R^2$ is obtained from the range of 0 to 1, and it shows there is a correlation between the thickness of oxide film and lightness when it gets closer to 1. The coefficient of determination $R^2$ of the thickness of oxide film and lightness of the Cu core ball 1A is 0.8229, which is a relatively small number below 1. Whereas, when a coefficient of determination of the thickness of oxide film and yellowness is obtained by the above-mentioned method, with the use of the values only before the yellowness's decreased shown in the FIG. 6, the coefficient of determination $R^2$ is 0.9523, which shows a value closer to 1, in managing by yellowness. Accordingly, the measured values vary widely in managing by lightness only, and thereby there is a problem that the thickness of oxide film cannot be managed precisely. For this reason, in the present invention, the precise management of the thickness of the oxide film of a Cu core ball 1A is conducted by using the both indexes of the lightness and the yellowness.

[2A. Cu Ball]

The following will describe sphericity and a composition of the Cu ball 2A constituting the Cu core ball 1A according to the present invention more in detail. The Cu ball 2A has the capability of controlling variation in the height of the solder joint because the Cu ball is not fused at a soldering temperature when the Cu core ball 1A is used for a solder bump. Therefore, it is preferable that the Cu ball 2A has high sphericity and a low variation in the diameter thereof. Further, it is preferable that the Cu ball 2A has low alpha dose similarly to the solder layer 3A, as described above. The following will describe a preferred embodiment of the Cu ball 2A.

<Composition of Cu Ball 2A>

A composition of the Cu ball 2A may be a composition of a single Cu or an alloy composition whose main component is Cu. When the Cu ball 2A is composed of an alloy, a content of Cu is equal to or greater than 50 mass %. In addition, a ball to be cored may be composed of a single metal of Ni, Ag, Bi, Pb, Al, Sn, Fe, Zn, In, Ge, Sb, Co, Mn, Au, Si, Pt, Cr, La, Mo, Nb, Pd, Ti, Zr or Mg besides Cu, or an alloy, a metal oxide, or a mixed metal oxide. Otherwise, it may be composed of a resin material.

<Purity of Cu Ball: 99.9% or More>

Although the purity of the Cu ball 2A constituting the present invention is not specifically limited, it is preferably 99.9% or more, from a viewpoint of controlling the alpha dose as necessary and preventing electro-conductivity and/or thermal conductivity of the Cu ball 2A from being deteriorated because of less purity thereof.

It is conceivable that the impurity elements contained in the Cu ball 2A may be Sn, Sb, Bi, Ni, Zn, Fe, Al, As, Ag, In, Cd, Pb, Au, P, S, Co, etc.

<Sphericity of Cu Ball: Equal to or Higher than 0.95>

For the Cu ball 2A constituting the present invention, the sphericity is equal to or higher than 0.95, in terms of controlling stand-off height. If the sphericity of the Cu ball 2A is lower than 0.95, the Cu ball 2A becomes into an indeterminate shape. Therefore, bumps having uneven heights are formed at the bump formation time and the possibility that poor joints occur is increased. Moreover, when the Cu core ball 1A is mounted on an electrode and a reflow treatment is performed thereon, there may be a position gap of the Cu core ball 1A and a self-alignment property becomes worse. The sphericity is more preferably equal to or higher than 0.990. In the present invention, the sphericity represents a gap from a true sphere. The sphericity can be determined by various kinds of methods, for example, a least squares center method (LSC method), a minimum zone center method (MZC method), a maximum inscribed center method (MIC method), a minimum circumscribed center method (MCC method), etc. For details, the sphericity is an arithmetic mean value calculated by dividing a diameter of each of the 500 pieces of the Cu balls 2A by a length of the longest axis of each Cu ball 2A. It is shown that when a value thereof is closer to the upper limit 1.00, this is closer to the true sphere. In this invention, the length of the diameter and the length of the longest axis are referred to as lengths measured by measuring equipment, ultra-quick vision, ULTRA QV 350-PRO manufactured by Mitsutoyo Corporation.

<Diameter of Cu Ball: 1-1000 µm>

A diameter of the Cu ball 2A constituting the present invention is preferably 1-1000 µm. If the diameter is within this range, the spherical Cu ball 2A can be stably manufactured. Moreover, a shorted connection can be suppressed when a pitch between the terminals is narrow.

Here, for example, if the diameter of the Cu core ball 1A according to the present invention is about 1-300 µm, a collection of 'Cu core balls' may be called as 'Cu core powder'. The 'Cu core powder' is the collection of many Cu core balls 1A, each of which has the property as mentioned above. It is distinguished from a single Cu core ball 1A in usage form, such as it is mixed as the powder in solder paste, for example. Similarly, in a case that it is used for forming a solder bump, it is usually treated as a collection, and therefore the 'Cu core powder' used in such a form is distinguished from the single Cu core ball 1A.

[3A. Solder Layer]

The following will describe a composition of a solder layer 3A constituting the Cu core ball 1A according to the present invention more in detail.

<Composition of Solder Layer 3A>

The composition of a solder layer 3A may be a composition of a single Sn, an alloy composition of the lead-free solder alloy whose main component is Sn, or a composition of a Sn—Pb solder alloy. When the solder layer 3A is composed of an alloy, a content of Sn is equal to or greater than 40 mass %. As an example of the composition of the lead-free solder, for example, Sn, Sn—Ag alloy, Sn—Cu alloy, Sn—Bi alloy, Sn—Ag—Cu alloy, Sn—In alloy and an alloy in which a predetermined alloy element is added to them are exemplified. An alloy element to be added may be, for example, Ag, Cu, In, Ni, Co, Sb, P, Fe, etc. As for an additive amount of alloy element to be added, it is preferable that the yellowness and lightness of lead-free solder alloy are reduced to almost the same degree as the yellowness and lightness of the single Sn. An alloy composition of the solder layer 3A is preferably Sn-3Ag-0.5 Cu alloy among them, in terms of thermal fatigue life. A thickness of the solder layer 3A is not specifically limited: It is, for example, equal to or less than 100 µm (at each side thereof), which is sufficient. Generally, 20-50 µm at each side of the layer may be preferable. Moreover, a Sn content of the lead-free solder alloy whose main component is Sn according to the present invention is preferably equal to or more than 80%, and more preferably equal to or more than 90%.

[4A. Method of Manufacturing Cu Core Ball]

Next, the following will describe an example of a method of manufacturing the Cu core ball 1A according to this invention. As for the Cu ball 2A constituting the Cu core ball 1A, the Cu material as the material thereof is put on a plate having heat-resisting property such as ceramics and is heated in a furnace together with the heat-resisting plate. There are many dimples each having a hemispheric bottom in the heat-resisting plate. A diameter of the dimple and a depth thereof are suitably set according to a diameter of the Cu ball 2A. For example, the diameter thereof is 0.8 mm and the depth thereof is 0.88 mm. Further, the Cu materials each having a chip shape (hereinafter, referred to as 'chip material'), which are obtained by cutting a fine wire made of Cu, are put into the dimples one by one in the heat-resisting plate.

The heat-resisting plate in which the chip materials have been put into the dimples is heated at 1100-1300 degrees C. in the furnace into which reducing gas such as ammonia decomposition gas is filled and a heating process is performed thereon during 30 through 60 minutes. In this moment, when temperature in the furnace is more than the melting point of Cu, the chip material is fused so that it becomes sphered. Thereafter, the interior of the furnace is cooled and the Cu ball 2A is formed in each of the dimples of the heat-resisting plate. After being cooled, the formed Cu ball 2A may be reheated at 800 through 1000 degrees C., which is the temperature lower than a melting point of Cu.

Further, as other methods, there are an atomizing method in which the fused Cu is dropped down from an orifice pierced in a bottom of a melting pot and the droplet is rapidly cooled to be sphered as the Cu ball 2A and a method in which thermal plasma heats cut metal of Cu at a temperature of 1000 degrees C. or more to be sphered. Each of the Cu ball 2A sphered in such a way may be reheated at about 800 through 1000 degrees C. for 30 through 60 minutes. In addition, the Cu material as a raw material of the Cu ball 2A may be heated at 800 through 1000 degrees C. before the Cu ball 2A is sphered.

As the Cu material that is a raw material of the Cu ball 2A, for example, pellet, wire, pillar and the like can be used. The Cu material may have purity of 99.9%-99.995% from a viewpoint such that the purity in the Cu ball 2A is not too low.

In a case of using a Cu material having the further high purity, the heating treatment mentioned above is not performed and a retention temperature of the fused Cu may be lowered to approximately 1000 degrees C. as in a conventional way. Thus, the above-mentioned heating treatment may be omitted or changed according to the purity in the Cu material.

As the method of forming the solder layer 3A on the Cu ball 2A by flowing the plating solution with the Cu balls 2A manufactured as described above, there are an electrolytic plating method such as a known barrel plating, a method of generating a high speed turbulent flow in the plating solution within a plating tank by a pump connected to the plating tank and forming the solder layer 3A on the Cu ball 2A by the turbulent flow in the plating solution, a method of providing a vibration plate in a plating tank to vibrate it at predetermined frequency so that the plating solution is agitated by high speed turbulent flow and forming the solder layer 3A on the Cu ball 2A by the turbulent flow in the plating solution and the like.

The following will describe an example of forming the solder layer 3A (film thickness of a single side of which is 18 µm) of Sn—Ag—Cu after coating a Ni plating (film thickness of a single side of which is 2 μm) on the Cu ball 2A having a diameter of 100 μm to form the Cu core 1A ball having a diameter of about 140 μm.

A Sn—Ag—Cu containing plating solution according to an embodiment of the invention contains a solvent mainly composed of water, sulfonic acids and metal components of Sn, Ag and Cu, as essential components.

The metal components are present in the plating solution as Sn ions ($Sn^{2+}$ and/or $Sn^{4+}$), Ag ions ($A^+$), and Cu ions ($Cu^+/Cu^{2+}$). The plating solution is obtained by mixing plating mother liquor mainly composed of water and sulfonic acids with metallic compounds and preferably contains organic complex agent in order to stabilize the metal ions.

As the metallic compounds in the plating solution, the following ones are exemplified, for instance. As specific examples of the Sn compounds, tin salts of organic sulfonic acid such as methanesulfonic acid, ethanesulfonic acid, 2-propanol sulfonic acid, p-phenolsulfonic acid and the like and stannous compounds such as tin sulfate, tin oxide, tin nitrate, tin chloride, tin bromide, tin iodide, tin phosphate, tin pyrophosphate, tin acetate, tin formate, tin citrate, tin gluconate, tin tartrate, tin lactate, tin succinate, tin sulfamate, tin borofluoride, tin silicofluoride and the like are exemplified. A single species of these Sn compounds can be used or two species or more thereof can be mixed and used.

As the Cu compounds, copper salts of the above-mentioned organic sulfonic acid, copper sulfate, copper oxide, copper nitrate, copper chloride, copper bromide, copper iodide, copper phosphate, copper pyrophosphate, copper acetate, copper formate, copper citrate, copper gluconate, copper tartrate, copper lactate, copper succinate, copper sulfamate, copper borofluoride, copper silicofluoride and the like are exemplified. A single species of these Cu compounds can be used or two species or more thereof can be mixed and used.

As the Ag compounds, silver salts of the above-mentioned organic sulfonic acid, silver sulfate, silver oxide, silver chloride, silver nitrate, silver bromide, silver iodide, silver phosphate, silver pyrophosphate, silver acetate, silver formate, silver citrate, silver gluconate, silver tartrate, silver lactate, silver succinate, silver sulfamate, silver borofluoride, silver silicofluoride and the like are exemplified. A single species of these Ag compounds can be used or two species or more thereof can be mixed and used.

Further, when forming the solder layer 3A (film thickness of a single side of which is 20 μm) of Sn—Ag—Cu on the Cu ball 2A having a diameter of 100 μm, a quantity of electricity of about 0.0108 coulombs is required.

Blending quantities of respective metals in the plating solution are as follows: As $Sn^{2+}$, 0.21 through 2 mol/L, preferably 0.25 through 1 mol/L; As $Ag^+$, 0.01 through 0.1 mol/L, preferably 0.02 through 0.05 mol/L and as $Cu^{2+}$, 0.002 through 0.02 mol/L, preferably 0.003 through 0.01 mol/L. Here, since it is $Sn^{2+}$ that relates to the plating, a quantity of $Sn^{2+}$ may be adjusted in this invention.

Moreover, it is preferable that Ag ion concentration to Cu ion concentration (Ag/Cu molar ratio) is within a range of 4.5 through 5.58. If it stays within this range, it is possible to form the Sn—Ag—Cu based solder layer 3A such as Sn-3Ag-0.5Cu alloy that has a low melting point. Further, a desired deposition amount of solder plating is estimated according to a following formula (1) based on the Faraday's law of electrolysis and an amount of electricity therefor is calculated. The electric current flows through the plating solution so as to be the calculated amount of electricity and the plating is executed while the plating solution flows with the Cu balls 2A. A volume of the plating tank may be fixed according to a total input amount of the Cu balls 2A and the plating solution.

$$w\ (g)=(I \times t \times M)/(Z \times F) \qquad \text{Formula (1)}$$

In the formula (1), "w" is an electrolytic deposition amount (g); "I" is electric current (A); "t" is electricity energizing time (second); M is an atomic weight of a deposited element (in a case of Sn, 118.71); Z is an atomic value (in a case of Sn, bivalent); and F is the Faraday constant (96500 coulombs). The quantity of electricity Q (A*Sec.) is represented by I×t.

Although the plating has been executed in this invention while the plating solution flows with the Cu balls 2A, a flowing method thereof is not particularly limited. For example, the plating solution may flow with the Cu balls 2A by a rotation of barrel like the barrel electrolytic plating method.

After the plating process is executed, any drying is executed in the air or under $N_2$ atmosphere, so that it is possible to obtain the Cu core ball 1A according to the invention.

[1B. Cu Core Ball (Ge Added)]

The following will describe other configurations of the Cu core ball. The Cu core ball 1B according to the present invention contains a Cu ball (core) 2B for keeping a space between a semiconductor package and a printed circuit board, and a solder layer (covering layer) 3B that covers the Cu ball 2B, and the solder layer 3B contains Sn of 40% or more as well as Ge of 20 ppm through 220 ppm. The lightness of the Cu core ball 1B is equal to or more than 65 and yellowness thereof is equal to or less than 7.0. The following will describe each configuration of the Cu core ball 1B in detail. Moreover, as for a configuration and the like of the Cu core ball 1B, those are common with the Cu core ball 1A mentioned above, except Ge contained in a solder layer 3B, and therefore they will be described referring to FIG. 1 and a detailed description about the common matters will be omitted.

<Cu Core Ball (Solder Layer): Lightness is 65 or More and Yellowness is 7.0 or Less>

Figure 3:
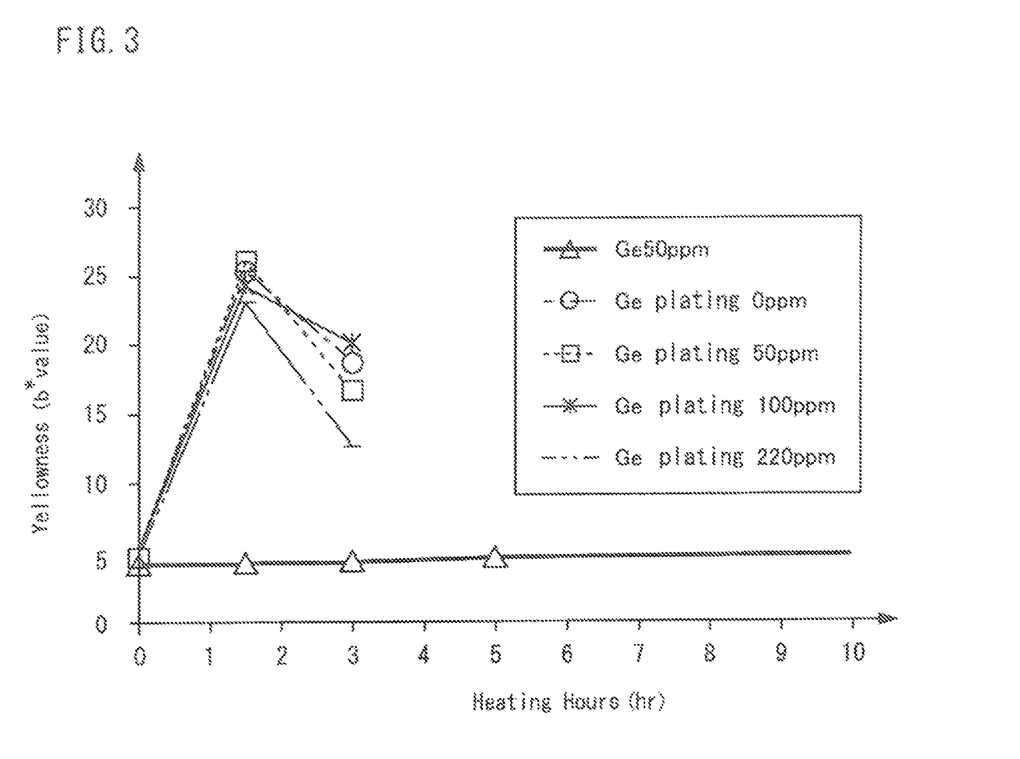
FIG. 3 is a graph showing a relationship between the yellowness and the heating hours for the Cu core balls and the solder balls, which have a solder layer to which Ge is added.

FIG. 3 is a graph showing a relationship between the yellowness and the heating hours for Cu core balls and solder balls. The vertical axis indicates the yellowness and the horizontal axis indicates the heating hours. As shown in FIG. 3, in a case of adding Ge to a solder ball, it is difficult to be oxidized, and any change in yellowness is barely seen. Whereas, in a Cu core ball, when a predetermined amount of Ge is added to a solder layer or when Ge is not added to a solder layer, the thicker the thickness of the oxide film on the surface is, the more the yellowness rises. After that, however, the color of the surface has changed and the yellowness has been lower. Accordingly, also when Ge is added to a solder layer of the Cu core ball, it has been found out that the behavior similar to the Cu core ball without Ge added shown in FIG. 6 is shown. Therefore, in the present invention, the thickness of the oxide film is managed by both indexes of the yellowness and lightness in the Cu core ball 1B, too.

For the Cu core ball 1B, its lightness is equal to or more than 65 and yellowness thereof is equal to or less than 7.0. More preferably, its lightness is equal to or more than 70 and yellowness thereof is equal to or less than 5.1. The thickness of the oxide film formed on the surface of the solder layer 3B can be managed at a fixed value or less, by selecting the Cu core ball 1B, lightness and yellowness of which are within the above-mentioned range. For example, when the lightness and yellowness of the Cu core ball 1B are measured and then the Cu core ball 1B having lightness of 65 or more and yellowness of 7.0 or less is selected, the thickness of the oxide film can be managed with 4 nm or less. In addition, when the lightness and yellowness of the Cu core ball 1B are measured and then the Cu core ball 1B having lightness of 70 or more and yellowness of 5.1 or less is selected, the thickness of the oxide film can be managed with 2 nm or less.

[2B. Cu Ball]

As for a composition, purity, alpha dose, sphericity, diameter and the like of the Cu ball 2B, those are common with the Cu ball 2A constituting the Cu core ball 1A mentioned above, and therefore a detailed description of them will be omitted.

[3B. Solder Layer]

The solder layer 3B is configured by adding Ge, which is within a range of 20 ppm or more and 220 ppm or less, to a composition similar to that of the solder layer 3A of the Cu core ball 1A mentioned above. Moreover, as for other alpha dose and the like of the solder layer 3B, they are common with those of the solder layer 3A mentioned above, and therefore a detailed description of them will be omitted.

<Ge: Equal to or More than 20 Ppm and Equal to or Less than 220 ppm>

When Ge of 20 ppm or more is added to the alloy composition of the solder layer 3B, oxidation resistance is improved at the time of melting the solder layer 3B and after melting it. Although an additive amount of Ge exceeds 220 ppm, the oxidation resistance can be secured, however the wettability tends to worsen. Accordingly, an additive amount of Ge is equal to or more than 20 ppm and equal to or less than 220 ppm, and more preferably equal to or more than 50 ppm and equal to or less than 200 ppm.

[4B. Method of Manufacturing Cu Core Ball]

As for the method of manufacturing the Cu core ball 1B, a manufacturing method similar to that of the Cu core ball 1A mentioned above can be adopted except to add Ge to the solder layer 3B, and therefore the following will describe the only points which differ from the method of manufacturing the Cu core ball 1A.

A Sn—Ag—Cu—Ge contained plating solution according to an embodiment of the invention contains a solvent mainly composed of water, sulfonic acids and metal components of Sn, Ag, Cu and Ge as essential components.

The metal components are present in the plating solution as Sn ions ($Sn^{2+}$ and/or $Sn^{4+}$), Ag ions ($Ag^+$), Cu ions ($Cu^+$ and/or $Cu^{2+}$) and Ge ions ($Ge^{2+}$ and/or $Ge^{4+}$). The plating solution is obtained by mixing plating mother liquor mainly composed of water and sulfonic acids with metallic compounds and preferably contains organic complex agent in order to stabilize the metal ions.

As the Ge compounds in the plating solution, germanium oxide, germanium hydride, germanium phosphate, germanium chloride, germanium bromide, germanium iodide and the like are exemplified. A single species of these Ge compounds can be used or two species or more thereof can be mixed and used.

In this way, the Cu core ball 1B having a diameter of approximately 140 μm is manufactured, in which the Cu ball 2B having a diameter of 100 μm is coated with a Ni plating layer (film thickness of a single side of which is 2 μm) and the solder layer 3B of Sn—Ag—Cu—Ge thereon (film thickness of a single side of which is 18 μm).

[1C. Cu Core Column]

Figure 4:
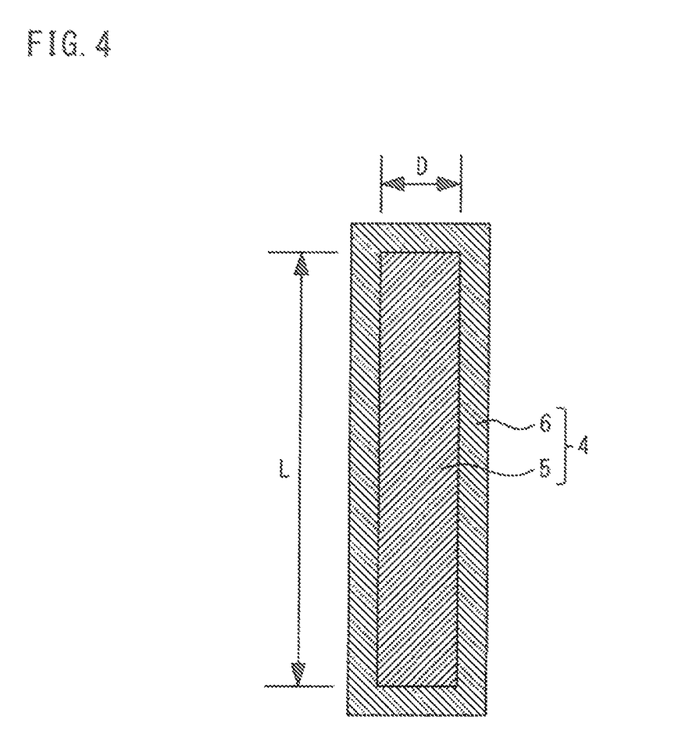
FIG. 4 is a cross-sectional view of a Cu core column according to an embodiment of the present invention for showing a configuration example thereof.

The following will describe a configuration of a Cu core column 4 according to the prevent invention. FIG. 4 is a cross-sectional view of the Cu core column 4 according to the present invention for showing a configuration example thereof. As shown in FIG. 4, the Cu core column 4 according to the present invention contains a Cu column (core) 5 for keeping a space between a semiconductor package and a printed circuit board, and a solder layer (covering layer) 6 that covers the Cu column 5. The lightness of the Cu core column 4 is equal to or more than 65 and yellowness thereof is equal to or less than 7.0. More preferably, the lightness of the Cu column 4 is equal to or more than 70 and yellowness thereof is equal to or less than 5.1. The thickness of the oxide film formed on the surface of the solder layer 6 can be managed at a fixed value or less, by selecting the Cu core column 4 having the lightness and the yellowness within the above-mentioned range as them of the Cu core column 4. In addition, the Cu core column 4 differs from the balls such as the Cu core ball 1A only in shape, and the other configurations are common with the Cu core ball 1A, and therefore a detailed description about the common matters will be omitted.

[2C. Cu Column]

The Cu column 5 may have a composition of a single Cu or an alloy composition whose main component is Cu. When the Cu column 5 is composed of an alloy, a content of Cu is equal to or greater than 50 mass %. In addition, a ball to be cored may be composed of a single metal of Ni, Ag, Bi, Pb, Al, Sn, Fe, Zn, In, Ge, Sb, Co, Mn, Au, Si, Pt, Cr, La, Mo, Nb, Pd, Ti, Zr, Mg besides Cu, an alloy, a metal oxide or a mixed metal oxide. Otherwise, it may be composed of a resin material. The Cu column 5 is configured to have an elongated cylindrical shape. A length L of the Cu column 5 is 1 through 3000 μm, for example and a diameter D of the Cu column is 1 through 1000 μm, for example. In a case where a Cu column having a highly flexible and low Vickers hardness is required, an annealing treatment may be conducted on the Cu column 5. Moreover, as for other composition, purity, alpha dose, sphericity and the like of the Cu column 5, they are common with those of the Cu ball 2A of the Cu core ball 1A mentioned above or the like, and therefore a detailed description of them will be omitted.

[3C. Solder Layer]

The solder layer 6 may have a composition of a single Sn or an alloy composition of the lead-free solder alloy whose main component is Sn. When the solder layer 6 is composed of an alloy, a content of Sn is equal to or greater than 40 mass %. A thickness of the solder layer 6 is not specifically limited: It is, for example, equal to or less than 100 μm (at each side thereof), which is sufficient. Generally, 20-50 μm may be preferable. By adding Ge within a range of 20 ppm or more and 220 ppm or less to the solder layer 6, oxidation resistance can be retained at the time of melting the solder layer 6 and after melting it. Moreover, as for other composition, alpha dose and the like of the solder layer 6, they are common with those of the solder layer 3A of the Cu core ball 1A mentioned above or the like, and therefore a detailed description of them will be omitted.

[4C. Method of Manufacturing Cu Core Column]

A known technology can be adopted for the method of manufacturing the Cu column 5 of the Cu core column 4. For example, a copper wire is passed through a die and is drawn to extend to a predetermined diameter. After that, the extended copper wire is cut into a predetermined length to manufacture a Cu column 5. Subsequently, the solder layer 6 is formed on the manufactured Cu column 5. As the method of forming the solder layer 6, there are an electrolytic plating method such as a known barrel plating, a method of generating a high speed turbulent flow in the plating solution within a plating tank by a pump connected to the plating tank and forming the solder layer 6 on the Cu column 5 by the turbulent flow in the plating solution, a method of providing a vibration plate in a plating tank to vibrate it at predetermined frequency so that the plating solution is agitated by high speed turbulent flow and forming the solder layer 6 on the Cu column 5 by the turbulent flow in the plating solution and the like. As for the other manufacture methods, they are the same as those of the solder layer 3A of the Cu core ball 1A mentioned above and the like, and therefore a detailed description of them will be omitted. In a case of adding Ge to the solder layer 6, it is also the same as the embodiment mentioned above, and therefore a detailed description of them will be omitted.

Additionally, in the Cu core balls 1A and 1B and the Cu core column 4 according to this invention, a surface of each of the Cu balls 2A, 2B and the Cu column 5 may be previously covered by a plating layer made of other metal before the solder layers 3A, 3B, 6 are formed. Particularly, when Ni plating layer, Co plating layer or the like is previously covered on the surface of each of the Cu balls 2A, 2B and the Cu column 5, at the time of joining them to an electrode, it is possible to decrease diffusion of Cu to the solder so that it is possible to suppress copper leaching in the Cu balls 2A, 2B and the Cu column 5. Further, the metal constituting the plating layer is not limited to a single metal element. An alloy in which two elements or more selected among Ni, Co and the like are combined may be used therefor.

It is preferable that the sphericity of each of the Cu core balls 1A, 1B according to the invention is 0.95 or more. When each of the Cu core balls 1A, 1B has low sphericity, an alignment of each of the Cu core balls 1A, 1B is failed when the Cu core ball 1A or 1B is mounted on the electrode and any reflow processing is executed thereon and its self-alignment property also deteriorates. It is more preferable that the sphericity is 0.99 or more.

Moreover, the whole surface of each of the Cu core balls 1A, 1B, and the Cu core column 4 according to this invention can be coated with flux. In addition, the Cu core balls 1A, 1B, and the Cu core column 4 according to the present invention can be used for a formed solder in which the Cu core balls 1A, 1B, and the Cu core column 4 are dispersed in solder. In the solder paste and the formed solder, for example, a solder alloy having a composition of Sn-3Ag-0.5Cu (each value is % by mass) is used, however, the present invention is not limited to this solder alloy. Furthermore, the Cu core balls 1A, 1B, and the Cu core column 4 according to the present invention can be used for a solder joint of electronic components. In addition, the Cu core balls 1A, 1B according to this invention can be applied to the form of pillars and pellets including Cu as the core.

In addition, a core constituting the Cu core balls 1A, 1B, or the Cu core column 4 according to this invention can be composed of a resin ball. As resin materials, for example, amino resin, acrylic resin, ethylene-vinyl acetate copolymer, styrene butadiene block copolymer, polyester resin, melamine resin, phenol resin, alkyd resin, polyimide resin, urethane resin, epoxy resin, crosslinked resin are exemplified. It is preferable that especially electro-conductive plastic such as polyacetylene, polypyrrole, polythiophene, polyaniline or the like is used. In a case of a core as the resin materials, a Cu core ball can be composed of a resin ball, a Cu plating layer (functioning layer) covering the surface of the resin ball, a Ni plating layer (functioning layer) covering the surface of the Cu plating layer, and a Sn—Ag—Cu based solder plating layer (covering layer) covering the surface of the Ni plating layer. The Cu core ball can be also composed of a resin ball, a Cu plating layer covering the surface of the resin ball, a Ni plating layer covering the surface of the Cu plating layer, a Cu plating layer covering the surface of the Ni plating layer, and a Sn—Ag based solder plating layer covering the surface of the Cu plating layer. In addition, a kind or a layered structure of the functioning layer and the covering layer mentioned above is not limited to the examples mentioned above.

Executed Examples

The following will describe executed examples of the invention, but the invention is not limited thereto. First of all, in the executed examples, the Cu balls having the high sphericity were manufactured and their sphericities and the alpha dose thereof were measured.

<Manufacturing of Cu Ball>

Cu pellets each having a purity of 99.9%, Cu wires each having a purity of 99.995% or less and Cu plates each having a purity exceeding 99.995% were prepared. They were respectively put into the melting pot, the temperature of the melting pot was then risen to 1200 degrees C. and this heating treatment was performed during 45 minutes. Subsequently, the fused Cu was dropped down from an orifice pierced through a bottom of the melting pot and the dropped droplet was cooled so as to be granulated as the Cu ball. Thus, the Cu balls having a mean diameter of 100 μm were manufactured.

<Sphericity>

The sphericity of the manufactured Cu ball was measured using CNC image measurement system. Specifically, the ultra quick vision, ULTRA QV350-PRO manufactured by MITSUTOYO Corporation was used. In the executed examples, a length of the longest axis and the diameter of the Cu ball were measured by the measuring equipment mentioned above, and the sphericity was obtained by calculating an arithmetic mean value which was calculated by dividing diameters of 500 Cu balls by their longest axes. It is shown that when a value thereof is closer to the upper limit of 1.00, this is closer to the true ball.

<Alpha Dose>

The alpha dose of the manufactured Cu ball was measured using alpha dose measurement equipment of a gas flow type proportional counter. A measurement sample was a 300 mm×300 mm flat shallow container with the Cu balls being bedded on a bottom thereof so as not to see the bottom. This measurement sample was put in the alpha dose measurement equipment and was remained in an atmosphere of PR-10 gas flow for 24 hours, and then the alpha dose was measured.

In addition, the PR-10 gas (argon 90% and methane 10%) used for the measurement was one that a gas bottle filled with the PR-10 gas was kept for a period equal to or longer than three weeks. Using the gas bottle kept for the period equal to or longer than three weeks is a reason why this is based on JESD221 of JEDEC STANDARD-Alpha Radiation Measurement in Electronic Materials determined by JEDEC (Joint Electron Device Engineering Council) so as not to produce the alpha-ray by radon in the atmospheric air that enters into the gas bottle.

Table 1 shows the element analysis result and sphericity of each of the manufactured Cu balls. Inductively-coupled Plasma Source Mass Spectrometry (ICP-MS) analysis was used for the element analysis of U and Th, and Inductively-coupled Plasma Atomic Emission Spectroscopy (ICP-AES) analysis was used for the element analysis of the other elements. In Table 1, a unit of each of the U and Th is mass ppb, and a unit of each of the other elements is mass ppm.

TABLE 1

| | Cu Composition | | | | | | | | | | | | | | | SPHERICITY |
|---|---|---|---|---|---|---|---|---|---|---|---|---|---|---|---|---|
| | Cu | Sn | Sb | Bi | Zn | As | Ag | Cd | Ni | Pb | Au | P | S | U | Th | |
| Cu ball using Cu pellet having the purity of 99.9% | bal. | 84 | 21 | 32 | 3 | 49 | 20 | 7 | 4 | 16 | 4 | 200 | 18 | 1.5 | <0.5 | 0.9932 |
| Cu ball using Cu wire having the purity of 99.995% or less | bal. | 8 | 10 | 19 | — | 24 | 13 | — | 1 | 8 | — | — | — | <0.5 | <0.5 | 0.9931 |
| Cu ball using Cu plate having the purity exceeding 99.995% | bal. | 13 | 2 | 18 | — | 10 | — | — | 1 | 3 | — | — | — | 0.9 | <0.5 | 0.9227 |

As shown in Table 1, both of the Cu balls using the Cu pellet having the purity of 99.9% and the Cu wire having the purity of 99.995% or less showed sphericity of 0.99 or more. Whereas, the Cu ball using the Cu plate having the purity exceeding 99.995% showed sphericity of 0.95 or less. Although the alpha dose is not shown in Table 1, the alpha dose of each of the Cu balls using the Cu pellet, the Cu wire, and the Cu plate respectively was equal to or less than 0.0010 cph/cm$^2$, which was below the required amount of 0.0200 cph/cm$^2$.

<Thickness of Oxide Film, Lightness, and Yellowness of Cu Core Ball (No Ge Added)>

Next, a Ni plating layer was formed on a surface of the above mentioned Cu ball having the sphericity of 0.990 or more and the alpha dose of 0.0200 cph/cm$^2$ or less and further a solder layer was formed on a surface of the Ni plating layer to manufacture a Cu core ball. The thickness of oxide film, lightness and yellowness of the manufactured Cu core ball were measured, respectively. In addition, the Cu core ball which was used for the measurement was a Cu core ball having a diameter of 140 μm, which had been manufactured by forming a Ni plating layer (film thickness of a single side of which is 2 μm) on a Cu ball having a diameter of 100 μm to make a Ni plated Cu ball having a diameter of 104 μm, and further by forming a solder plating layer (film thickness of a single side of which is 18 μm) on the Ni plated Cu ball. A composition of the solder layer is Sn-3Ag-0.5 Cu alloy.

In the executed example 1A, a freshly manufactured Cu core ball was used. In the executed example 2A, a Cu core ball was stored in a normal temperature (air exposure) with the humidity of 30% through 40% for 2 days. In addition, a normal temperature means 20 degrees C. through 30 degree C. In the executed example 3A, a Cu core ball was stored in a normal temperature with the humidity of 30% through 40% for 5 days. In the executed example 4A, a Cu core ball was stored in a normal temperature with the humidity of 30% through 40% for 7 days. In the executed example 5A, a Cu core ball was stored in a normal temperature with the humidity of 30% through 40% for 10 days. In the executed example 6A, a Cu core ball was stored in a normal temperature with the humidity of 30% through 40% for 14 days. In the executed example 7A, a Cu core ball was stored in the temperature of 40 degrees C. with the humidity of 90% for 1 day. In the executed example 8A, a Cu core ball was stored in a normal temperature with the humidity of 30% through 40% for 20 days. In the executed example 9A, a Cu core ball was stored at the temperature of 40 degrees C. with the humidity of 90% for 2 days. In the executed example 10A, a Cu core ball was stored at the temperature of 150 degrees C. for 1 day.

In the comparison example 1A, a Cu core ball was stored at the temperature of 40 degrees C. with the humidity of 90% for 5 days. In the comparison example 2A, a Cu core ball was stored at the temperature of 40 degrees C. with the humidity of 90% for 7 days. In the comparison example 3A, a Cu core ball was stored at the temperature of 40 degrees C. with the humidity of 90% for 10 days. In the comparison example 4A, a Cu core ball was stored at the temperature of 40 degrees C. with the humidity of 90% for 14 days. In the comparison example 5A, a Cu core ball was stored at the temperature of 150 degrees C. for 5 days. In the comparison example 6A, a Cu core ball was stored at the temperature of 150 degrees C. for 7 days.

Subsequently, each of the Cu core balls which had been stored under the conditions mentioned above in the executed examples 1A through 10A and the comparison examples 1A through 6A was collected and then lightness, yellowness, and thickness of oxide film of each of the collected Cu core balls were measured, respectively. The lightness and the yellowness of each of the Cu core balls were measured with the use of CM-2600d Spectrophotometer manufactured by Konica Minolta. The thickness of the oxide film of each of the Cu balls was measured by FE-AES of ULVAC PHI700. An acceleration voltage of the measuring apparatus is 10 kV and an irradiation current is 10 nA. The thickness of the oxide film (depth) was obtained by a speed of etching the surface of the sample with an Ar ion gun (etching rate), and an etching depth which is ½ peak value of oxygen-originated Intensity was used as an approximate value of the oxide film thickness. An etching rate is a SiO$_2$ conversion value obtained by converting a standard sample with etching speed. Table 2 shows a relationship among the lightness, yellowness and thickness of oxide film of the measured Cu core ball in each of the executed examples 1A through 10A and the comparison examples 1A through 6A. In Table 2, a unit of the thickness of oxide film is (nm).

TABLE 2

| | Lightness | Yellowness | Thickness of Oxide Film (nm) | Storage Conditions (Temperature/Humidity/Days of Storage) |
|---|---|---|---|---|
| EXECUTED EXAMPLE 1A | 71.4 | 4.6 | 1.2 | Initial State |
| EXECUTED EXAMPLE 2A | 72.3 | 4.8 | 1.5 | Normal Temperature/30-40%/2 Days |
| EXECUTED EXAMPLE 3A | 71.1 | 5.0 | 1.7 | Normal Temperature/30-40%/5 Days |

TABLE 2-continued

| | Lightness | Yellowness | Thickness of Oxide Film (nm) | Storage Conditions (Temperature/Humidity/Days of Storage) |
|---|---|---|---|---|
| EXECUTED EXAMPLE 4A | 71.5 | 5.0 | 1.8 | Normal Temperature/30-40%/7 Days |
| EXECUTED EXAMPLE 5A | 71.0 | 5.1 | 1.9 | Normal Temperature/30-40%/10 Days |
| EXECUTED EXAMPLE 6A | 73.0 | 5.5 | 2.1 | Normal Temperature/30-40%/14 Days |
| EXECUTED EXAMPLE 7A | 71.7 | 5.2 | 2.2 | 40° C./90%/1 Day |
| EXECUTED EXAMPLE 8A | 71.3 | 5.5 | 2.3 | Normal Temperature/30-40%/20 Days |
| EXECUTED EXAMPLE 9A | 71.1 | 6.8 | 3.4 | 40° C./90%/2 Days |
| EXECUTED EXAMPLE 10A | 71.3 | 6.6 | 3.8 | 150° C./1 Day |
| COMPARISON EXAMPLE 1A | 69.2 | 8.2 | 3.9 | 40° C./90%/5 Days |
| COMPARISON EXAMPLE 2A | 69.1 | 7.2 | 4.1 | 40° C./90%/7 Days |
| COMPARISON EXAMPLE 3A | 70.0 | 8.2 | 5.0 | 40° C./90%/10 Days |
| COMPARISON EXAMPLE 4A | 69.7 | 8.9 | 5.9 | 40° C./90%/14 Days |
| COMPARISON EXAMPLE 5A | 49.6 | 2.9 | 8.7 | 150° C./5 Days |
| COMPARISON EXAMPLE 6A | 48.1 | −1.5 | 14.3 | 150° C./7 Days |

As shown in the executed examples 1A through 10A of Table 2, when a Cu core ball having lightness of 65 or more and yellowness of 7.0 or less was selected, the thickness of oxide film was equal to or less than 3.8 nm. In addition, as shown in the executed examples 1A through 5A of Table 2, when a Cu core ball having lightness of 70 or more and yellowness of 5.1 or less was selected, the thickness of oxide film was equal to or less than 1.9 nm, and a Cu core ball having a thinner thickness of oxide film compared to other executed examples 6A through 10A was obtained.

Whereas, as shown in the comparison examples 1A through 6A, when the lightness of the Cu core ball was less than 65, or the yellowness thereof exceeded 7.0, the thickness of oxide film was equal to or more than 3.9 nm, and the thickness of oxide film was thicker than required. Consequently, it has been found out that a Cu core ball having a thin thickness of oxide film can be provided by selecting a Cu ball having lightness of 65 or more and yellowness of 7.0 or less.

In addition, the redness (a* value) was also measured, however, it has been confirmed that the redness cannot be used as an index for managing the thickness of oxide film because the redness was smaller than the correlation coefficient with the thickness of oxide film and contribution ratio 1.

In addition, the alpha dose of each of the Cu core balls in the executed examples 1A through 10A was measured. However, although the result is not shown in the above-mentioned Tables, the alpha dose of each of the Cu core balls was equal to or less than 0.0010 cph/cm², which did not reach the required amount of 0.0200 cph/cm².

Next, solderability (solder wettability) was examined when a reflow treatment was conducted with the use of the Cu core balls in the above-mentioned executed examples. As mentioned above, the oxide film having a predetermined film thickness is formed on the surface of the Cu core ball according to the storage conditions, however, there is an occasion when all of the oxide film cannot be removed even with the flux at the time of the reflow treatment, when exceeding a certain thickness of the oxide film on the surface of the Cu core ball. In this case, solder constituting a Cu core ball does not wetly spread across the whole electrode at the time of jointing, due to the influence of the oxide film, therefore the electrode is exposed, which leads to a defect.

In the following, an experiment on solderability was conducted when using the Cu core balls described in the executed examples 1A, 10A, and the comparison examples 3A, 4A, 5A. Specifically, the Cu core balls were placed on the Cu substrate to which the flux WF-6400 manufactured by Senju Metal Industry Co., Ltd is applied and then a reflow treatment was conducted on the Cu substrate on which the Cu core balls were placed under the atmospheric environment. Subsequently, the thickness of oxide film on the surface of each of the Cu core balls in the executed examples 1A, 10A, and the comparison examples 3A, 4A, 5A and the height of each of the solder bumps thereof after the reflow treatment was measured, respectively. A peak temperature of the reflow treatment was set at 245 degrees C.

In the present experiment, solder bumps are formed by joining Cu core balls on a simple Cu substrate not having resists which should be in the vicinity of electrodes on the substrate. Therefore, for Cu core balls having thickness of oxide film of a certain value or less, the solder constituting the Cu core balls wetly spreads over the Cu substrate at the time of joining, without being blocked by the resists. Accordingly, almost of the solder flows downward from the Cu core balls, so that any Cu balls become exposed on the tops of the solder bumps. Whereas, for Cu core balls having a thick oxide film, the solder constituting the Cu core balls does not wetly spread sufficiently at the time of joining, and the solder remains on the tops (bump tops) of the Cu balls (solder bumps). Accordingly, due to the remaining solder, the heights of the solder bumps becomes higher, compared to the heights of the solder bumps formed by using the Cu core balls having the thickness of oxide film of a certain value or less. In this way, it has been confirmed that there is a close correlation among the thickness of oxide film, the height of the solder bump and the solderability (wettability). In addition, when the height of the solder bump becomes higher, at least one of lightness and yellowness of the Cu core ball becomes also higher, and therefore, it has been also confirmed that there is a correlation among the lightness, the yellowness and the solderability.

Table 3 shows a relationship to lightness, yellowness and an average height of the solder bumps of each of the Cu core balls. The average height of the solder bumps is obtained by calculating an arithmetic mean of measured values obtained by respectively measuring the heights which are from surfaces joining the Cu core balls of the Cu substrates for 10 samples of solder bumps manufactured under the same condition up to the highest points of the solder bumps, by using OPTELICS C130 manufactured by Lasertec Corporation.

Figure 5A:
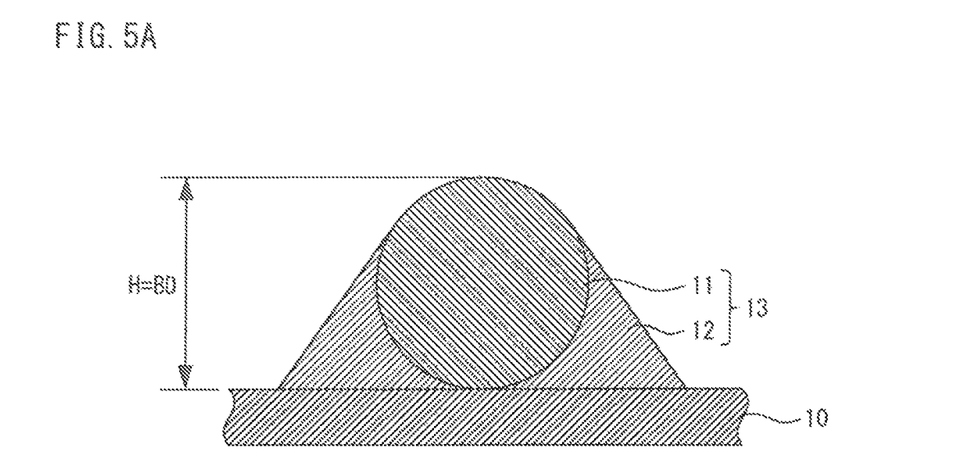
FIG. 5A is a cross-sectional view of a solder bump for showing a case of good solderability in the present experiment.
Figure 5B:
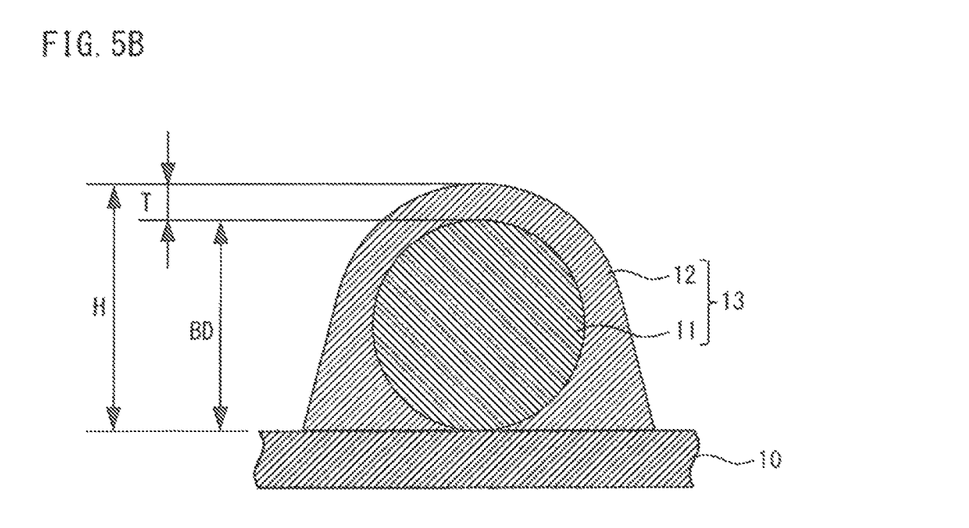
FIG. 5B is a cross-sectional view of the solder bump for showing a case of poor solderability in the present experiment.

An assessment method of solderability will be described here. FIG. 5A is a cross-sectional view of a solder bump 13 for showing a case of good solderability in the present experiment and FIG. 5B is a cross-sectional view of the solder bump for showing a case of poor solderability in the present experiment. As shown in FIG. 5A, when a top of Cu ball 11 placed on a Cu substrate 10 is exposed and solder 12 flows downward to the side periphery of the Cu ball 11, it is possible to judge that the solder 12 has wetly spread smoothly. Therefore, in the state of the solder bump 13 shown in FIG. 5A in the executed examples, it has been judged that the solderability is good, when an average height H of the solder bumps is 105 µm, considering a diameter BD of the Cu ball 11 and thickness (1 µm) of intermetallic compound layer, not shown, or the like, which is formed between the Cu substrate 10 and the Cu ball 11. Whereas, as shown in FIG. 5B, it is possible to judge that the solder 12 has not wetly spread smoothly, when the solder 12 remains on the top of the Cu ball 11 placed on the Cu substrate 10. For that reason, in the executed examples, as shown in FIG. 5B, it has been judged that the solderability is poor, when an average height H of the solder bumps of the solder bump 13 exceeds 105 µm, in the sum of a diameter BD of the Cu ball 11+the thickness of a formed intermetallic compound layer+ the thickness T of solder 12. Additionally, although the lightness and the yellowness have been used as threshold values when evaluating solderability in the executed examples, an average height of the solder bumps may be also used as a threshold value.

Next, Cu core balls in which a predetermined amount of Ge was added to the solder layers of the Cu core balls were manufactured and oxidation resistance of the manufactured Cu core balls was examined. Specifically, a Ni plating layer was formed on a surface of each of the Cu balls having sphericity of 0.990 or more and alpha dose of 0.0200 cph/cm$^2$ or less, and a solder layer to which Ge was added is formed on a surface of each Ni plating layer to manufacture Cu core balls. The thickness of oxide film, lightness and yellowness of each of the manufactured Cu core balls were measured, respectively. In addition, each Cu core ball which was used for the measurement was a Cu core ball having a diameter of 140 µm, which had been manufactured by coating the Ni plating layer (film thickness of a single side of which is 2 µm) on a Cu ball having a diameter of 100 µm to make a Ni plated Cu ball having a diameter of 104 µm, and further by coating a solder plating layer thereon (film thickness of a single side of which is 18 µm).

In the executed example 1B, a Cu core ball in which Ge was not added to Sn-3Ag-0.5Cu alloy in the solder layer thereof was used. In the executed example 2B, a Cu core ball in which Ge of 50 ppm was added to Sn-3Ag-0.5Cu alloy in

TABLE 3

|  | Acceleration Test Conditions (Temperature/Humidity/Days of Storage/Thickness of Oxide Film) | Lightness | Yellowness | Average Height of Solder Bumps (µm) |
|---|---|---|---|---|
| EXECUTED EXAMPLE 1A | Initial State/1.2 nm | 71.4 | 4.6 | 105 |
| EXECUTED EXAMPLE 10A | 150° C./1 Day/3.8 nm | 71.3 | 6.6 | 105 |
| COMPARISON EXAMPLE 3A | 40° C./90%/10 Days/5.0 nm | 70.0 | 8.2 | 109 |
| COMPARISON EXAMPLE 4A | 40° C./90%/14 Days/5.9 nm | 69.7 | 8.9 | 111 |
| COMPARISON EXAMPLE 5A | 150° C./5 Days/8.7 nm | 49.6 | 2.9 | 111 |

As shown in Table 3, for the Cu core balls in the executed examples 1A, 10A, the lightness of each of the Cu core balls is equal to or more than 65 and the yellowness thereof is equal to or less than 7.0, which has been found out that both conditions of the lightness and the yellowness are met. Consequently, it has been proved that the deterioration of the solderability can be prevented if the Cu core balls in the executed examples 1A, 10A are used. Whereas, for the Cu core balls in the comparison examples 3A, 4A, the lightness of each of the Cu core balls is equal to or more than 65, but the yellowness thereof exceeds 7.0, which has been found out that the condition of the yellowness is not met. In addition, for the Cu core ball in the comparison example 5A, the yellowness is equal to or less than 7.0, but the lightness thereof is less than 65, which has been found out that the condition of the lightness is not met. Consequently, it has been proved that the solderability becomes deteriorated when the Cu core balls in the comparison examples 3A, 4A and 5A are used.

<Thickness of Oxide Film, Lightness and Yellowness of Cu Core Ball (Ge Added)> the solder layer thereof was used. In the executed example 3B, a Cu core ball in which Ge of 100 ppm was added to Sn-3Ag-0.5Cu alloy in the solder layer thereof was used. In the executed example 4B, a Cu core ball in which Ge of 220 ppm was added to Sn-3Ag-0.5Cu alloy in the solder layer thereof was used.

In the comparison example 1B, a solder ball in which Ge of 50 ppm was added to Sn-3Ag-0.5Cu alloy was used.

Subsequently, each of the Cu core balls which had been stored under the conditions mentioned above in the executed examples 1B through 4B and the comparison example 1B was collected and then lightness, yellowness, and thickness of oxide film of each of the collected Cu core balls were measured, respectively. Equipment used for the measurement and conditions of setting the equipment are the same as those of the executed example 1A mentioned above or the like, and therefore a detailed description of them will be omitted. Table 4 shows a relationship between the lightness and the yellowness of the measured Cu core balls in the executed examples 1B through 4B and the comparison example 1B.

TABLE 4

| | Ge additive amount (ppm) | 0 hours | | 1.5 hours | | 3 hours | | 5 hours | | 24 hours | | Remark |
|---|---|---|---|---|---|---|---|---|---|---|---|---|
| | | Lightness | Yellowness | Lightness | Yellowness | Lightness | Yellowness | Lightness | Yellowness | Lightness | Yellowness | |
| EXECUTED EXAMPLE 1B | 0 | 73.2 | 4.6 | 55.1 | 25.4 | 46.1 | 18.7 | — | — | — | — | Cu Core Ball |
| EXECUTED EXAMPLE 2B | 50 | 73.6 | 4.6 | 51.4 | 26.1 | 44.4 | 16.7 | — | — | — | — | Cu Core Ball |

TABLE 4-continued

| | Ge additive amount (ppm) | 0 hours | | 1.5 hours | | 3 hours | | 5 hours | | 24 hours | | Remark |
|---|---|---|---|---|---|---|---|---|---|---|---|---|
| | | Lightness | Yellowness | Lightness | Yellowness | Lightness | Yellowness | Lightness | Yellowness | Lightness | Yellowness | |
| EXECUTED EXAMPLE 3B | 100 | 72.9 | 4.7 | 57.0 | 24.3 | 47.3 | 20.1 | — | — | — | — | Cu Core Ball |
| EXECUTED EXAMPLE 4B | 220 | 73.8 | 4.6 | 52.9 | 23.1 | 44.3 | 12.7 | — | — | — | — | Cu Core Ball |
| COMPARISON EXAMPLE 1B | 50 | 71.1 | 4.2 | 70.6 | 4.2 | 70.9 | 4.4 | 71.8 | 4.6 | 71.7 | 4.9 | Solder Ball |

As shown in the executed examples 1B through 4B and the comparison example 1B in Table 4, in a case where the Cu core ball having lightness of 65 or more and yellowness of 7.0 or less was selected when the storage duration is 0 hours, the thickness of oxide film was equal to or less than 3.8 nm, which was a target value. Consequently, it has been proved that a Cu core ball having a thin oxide film can be provided by selecting a Cu core ball where its lightness is equal to or more than 65 and yellowness is equal to or less than 7.0.

In addition, Ge having oxidation resistance was added to a solder layer of each of the Cu core balls in the executed examples 1B through 4B, however, an oxide film was formed on the surface of the solder layer, similarly to a case where Ge was not added to a solder layer of the Cu core ball. This is because Ge, which is known as an element showing oxidation resistance in the direction of the surface of the ball, cannot be diffused in the plating status of the solder layer, Ge became oxidized in the outermost surface of the ball, and thereby an effect of preventing an oxide film from growing inward could not be exerted. Whereas, in the comparison example 1B, since Ge became oxidized in the outermost surface of the ball and prevented an oxide film from growing inward, the thickness of oxide film became constant although the storage duration time elapsed.

Subsequently, a reflow treatment was conducted on the Cu core balls in the executed examples 1C through 5C and the comparison examples 1C, 2C, at 250 degrees C., with the use of Flux WF-6450 manufactured by Senju Metal Industry Co., Ltd, a cleaning treatment was conducted, and then, thickness of oxide film of the melted solder portion was measured, and a change in the thickness of the oxide film was tracked when heating-storing it at 150 degrees C. The measurement of the thickness of oxide film was conducted under the same conditions as those of the executed examples 1A through 10A and the comparison examples 1A through 6A. Thickness of oxide film thickness was represented in $SiO_2$ conversion value. Table 5 shows a relationship between heating hours and the thickness of oxide film of each of the measured Cu core balls in the executed examples 1C through 5C and the comparison examples 1C, 2C. The unit for the thickness of oxide film is (nm) in Table 5.

TABLE 5

| | | Ge additive amount (ppm) | Thickness of Oxide Film (nm) | | | | | | |
|---|---|---|---|---|---|---|---|---|---|
| | Plating Composition | | 0 hours | 10 hours | 20 hours | 50 hours | 100 hours | 150 hours | 200 hours |
| EXECUTED EXAMPLE 1C | Sn—3Ag—0.5Cu—Ge | 28 | 1.4 | 2.1 | 2.5 | 5.3 | 5.7 | 5.8 | 6.0 |
| EXECUTED EXAMPLE 2C | Sn—3Ag—0.5Cu—Ge | 50 | 1.4 | 1.9 | 2.4 | 4.9 | 5.3 | 5.5 | 5.7 |
| EXECUTED EXAMPLE 3C | Sn—3Ag—0.5Cu—Ge | 100 | 1.4 | 2.0 | 2.4 | 5.1 | 5.2 | 5.6 | 5.6 |
| EXECUTED EXAMPLE 4C | Sn—3Ag—0.5Cu—Ge | 150 | 1.3 | 1.9 | 2.8 | 4.8 | 5.2 | 5.4 | 5.6 |
| EXECUTED EXAMPLE 5C | Sn—3Ag—0.5Cu—Ge | 220 | 1.5 | 1.9 | 2.5 | 4.9 | 5.3 | 5.4 | 5.5 |
| COMPARISON EXAMPLE 1C | Sn—3Ag—0.5Cu | 0 | 1.3 | 3.7 | 5.3 | 10.8 | 14.9 | 19.4 | 23.2 |
| COMPARISON EXAMPLE 2C | Sn—3Ag—0.5Cu—Ge | 2 | 1.5 | 3.3 | 5.0 | 11.0 | 14.8 | 19.2 | 22.9 |

As shown in Table 5, for the Cu core ball in each of the executed examples 1C through 5C where Ge of 20 ppm or more was added to Sn-3Ag-0.5Cu alloy, any significant increase in the thickness of the oxide film was not seen although the heating hours become longer. Whereas, for the Cu core ball in the comparison example 1C, where Ge of 2 ppm was added to Sn-3Ag-0.5Cu alloy, or for the Cu core ball in the comparison example 2C, where Ge was not added, the thickness of oxide film was increased significantly as the heating hours were increased.

From the above, in a case of adding Ge of 20 ppm or more to a solder layer, it has been proved that oxidation resistance is improved after the solder is melted. As for the effect of oxidation resistance, it has been proved that more significant effects can be exerted especially when a content of Ge is equal to or more than 50 ppm. For this reason, a content of Ge is preferably equal to or more than 50 ppm. Whereas, when the content of Ge increases, the solder wettability tends to worsen. For this reason, a content of Ge is preferably equal to or less than 220 ppm and more preferably, equal to or less than 200 ppm. In this way, the most suitable solder bump can be formed by setting Ge to be added to a solder layer at the range mentioned above.

In addition, a Cu column was manufactured by passing a copper wire having a purity of 99.995% through a die to extend it so that the diameter φ of each of its top and bottom surfaces was 200 μm, and then, by cutting the copper wire at a position of the length of 200 μm (height L). After that, a Cu core column was manufactured by coating a solder plating layer of Sn-3Ag-0.5Cu alloy on a surface of the Cu column, and then, the thickness of oxide film, lightness and yellowness of the manufactured Cu core columns were measured, respectively.

Since it is impossible to measure the lightness and yellowness precisely in a situation where Cu columns only are bedded when measuring the lightness and yellowness of the Cu core columns, the Cu core balls manufactured under the same conditions as those of the Cu core columns were bedded together with the columns and the measurement was conducted. Equipment used for the measurement and conditions of setting the equipment except for the above-mentioned equipment and conditions are the same as those of the executed example 1A mentioned above or the like, and therefore a detailed description of them will be omitted.

Consequently, when a Cu core ball having lightness of 65 or more and yellowness of 7.0 or less was selected, the thickness of oxide film was equal to or less than 3.8 nm.

Next, a Cu core column was manufactured in which solder where Ge of 200 ppm was added to Sn-3Ag-0.5Cu alloy was covered and then, oxidation resistance of the manufactured Cu core ball was examined. Specifically, a Ni plating layer was formed on a surface of the Cu column having alpha dose of 0.0200 cph/cm$^2$ or less, and a Cu core ball was manufactured by forming a solder layer where Ge was added to a surface of the Ni plating layer, and then the thickness of oxide film, lightness and yellowness of the manufactured Cu core ball were measured, respectively. Equipment used for the measurement and conditions of setting the equipment are the same as that for the Cu core column coated with a solder plating layer of the Sn-3Ag-0.5Cu alloy.

Consequently, when a Cu core column having lightness of 65 or more and yellowness of 7.0 or less was selected, the thickness of oxide film was equal to or less than 3.8 nm.

In addition, the Cu core column according to the present invention can be also used for a through-silicon via (TSV) which connects electrodes between the vertically stacked semiconductors. TSV is manufactured: a hole is made in silicon by etching and an insulating layer is put into the hole and then, a Through Hole Via is put on top of the insulating layer, and subsequently, both of the top and bottom surfaces of the silicon are ground so that the Through Hole Via are exposed to the top and bottom surfaces of the silicon. In this process, a step of forming the Through Hole Via in which Cu or the like is conventionally filled into the hole by a plating method is adopted. However, in this method, the whole surface of the silicon is dipped into plating solution, and therefore, there is a risk of adsorption of impurities, moisture or the like. Accordingly, the column according to the present invention is directly nailed into the hole formed in the silicon along the height direction, and it can be used as the Through Hole Via. In a case of nailing the Cu core column into the silicon, it may be connected by a solder material such as solder paste and the like, and while in a case of nailing the Cu core column into the silicon, it can be connected by flux only. This allows any defect such as adsorption of impurities, moisture or the like to be prevented, and the manufacturing cost and manufacturing time can be also curtailed by omitting a plating step.

In addition, alpha dose of material used in the core, the covering layer used in the present invention and a whole solder material according to the present invention may be equal to or less than 0.0200 cph/cm$^2$. When the alpha dose is equal to or less than 0.0200 cph/cm$^2$, a soft error of electronic device can be prevented.

In addition, the technical scope of the present invention is not limited to the embodiments mentioned above, but includes additions of various changes to the embodiments mentioned above without departing from the scope of the invention.

DESCRIPTION OF CODES 1A, 1B Cu Core Ball (Solder Material)
2A, 2B Cu Ball (Core)
3A, 3B Solder Layer (Covering Layer)
4 Cu Core Column (Solder Material)
5 Cu Column (Core)
6 Solder Layer (Covering Layer)

The invention claimed is:

1. A solder material containing a spherical or cylindrical core for keeping a space between a joining object and an object to be joined, and a covering layer that covers the core, wherein the covering layer is composed of Sn or a solder alloy having a main component of Sn; and
   lightness of the solder material is equal to or more than 65 in a L*a*b* color space and yellowness thereof is equal to or less than 7.0 in the L*a*b* color space.

2. The solder material according to claim 1, wherein a thickness of an oxide film formed on a surface of the covering layer is equal to or less than 3.8 nm.

3. The solder material according to claim 1, wherein the lightness of the solder material is equal to or more than 70 and the yellowness thereof is equal to or less than 5.1.

4. The solder material according to claim 1, wherein the covering layer comprises Sn of 40% or more and Ge of 20 ppm or more and 220 ppm or less.

5. The solder material according to claim 1, wherein the core is covered with a layer which contains at least one element selected from a group of Ni and Co, and is covered with the covering layer.

6. The solder material according to claim 1, wherein the core is composed of a single metal of Cu, Ni, Ag, Bi, Pb, Al, Sn, Fe, Zn, In, Ge, Sb, Co, Mn, Au, Si, Pt, Cr, La, Mo, Nb, Pd, Ti, Zr or Mg, an alloy thereof, a metal oxide thereof, a mixed metal oxide thereof, or a resin material in the spherical shape.

7. The solder material according to claim 1, wherein the core is composed of a single metal of Cu, Ni, Ag, Bi, Pb, Al, Sn, Fe, Zn, In, Ge, Sb, Co, Mn, Au, Si, Pt, Cr, La, Mo, Nb, Pd, Ti, Zr or Mg, an alloy thereof, a metal oxide thereof, a mixed metal oxide thereof, or a resin material in the cylindrical shape.

8. A solder paste wherein the solder material according to claim 1 is used.

9. A solder preform wherein the solder material according to claim 1 is used.

10. A solder joint wherein the solder material according to claim 1 is used.

11. A solder material wherein alpha dose of at least one selected from a group of the core, the covering layer, and a whole solder material in the solder material according to claim 1 is equal to 0.0200 cph/cm$^2$ or less.

12. A method of managing a solder material which includes a spherical or cylindrical core for keeping a space between a joining object and an object to be joined and a covering layer that covers the core, wherein the covering layer is composed of Sn or a solder alloy having a main component of Sn, wherein the method comprises:
   measuring lightness and yellowness of the solder material in a L*a*b* color space; and
   selecting only a solder material showing the lightness of 65 or more and the yellowness of 7.0 or less based on the measurement result of the lightness and the yellowness of the solder material.

* * * * *